United States Patent
Minagawa et al.

(10) Patent No.: US 6,646,394 B2
(45) Date of Patent: Nov. 11, 2003

(54) CONTROL DEVICE FOR PLURALITY OF ROTATING ELECTRICAL MACHINES

(75) Inventors: Yuusuke Minagawa, Yokosuka (JP); Minoru Arimitsu, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/170,552

(22) Filed: Jun. 14, 2002

(65) Prior Publication Data

US 2003/0011331 A1 Jan. 16, 2003

(30) Foreign Application Priority Data

Jul. 9, 2001 (JP) .................................... 2001-207638
Jul. 10, 2001 (JP) .................................... 2001-209125

(51) Int. Cl.[7] .............................................. H02P 7/66
(52) U.S. Cl. ...................... 318/151; 310/114; 318/801
(58) Field of Search ........................ 318/151, 801; 310/114

(56) References Cited

U.S. PATENT DOCUMENTS 5,283,507 A * 2/1994 Stitt et al. .................... 318/376
6,211,597 B1 * 4/2001 Nakano ........................ 310/266
6,376,955 B1 * 4/2002 Arimitsu ...................... 310/114

FOREIGN PATENT DOCUMENTS

JP       11-275826       10/1999

* cited by examiner

Primary Examiner—Rita Leykin
(74) Attorney, Agent, or Firm—Foley & Lardner

(57) ABSTRACT

A control device for a rotating electrical machine system having a plurality of rotating electrical machines is provided with a single current control circuit and a controller. The controller sets an operating point of at least one rotating electrical machine of the plurality of rotating electrical machines, and sets the current for each rotating electrical machine so that one of the efficiency of the current control circuit and the overall efficiency with respect to all the rotating electrical machines. The controller controls the current control circuit so that the current control circuit supplies a composite current to all rotating electrical machines, the composite current combining the set current for each rotating electrical machine.

12 Claims, 12 Drawing Sheets

US 6,646,394 B2

CONTROL DEVICE FOR PLURALITY OF ROTATING ELECTRICAL MACHINES

FIELD OF THE INVENTION

This invention relates to a control device for a plurality of rotating electrical machines.

BACKGROUND OF THE INVENTION

Tokkai-Hei-11-275826 published by the Japanese Patent Office in 1999 discloses a control device for a plurality of rotating electrical machines which are independently controlled by a single inverter of the control device. This control device supplies all the rotating electrical machines with a composite current obtained by combining alternating currents for the rotating electrical machines which flow in accordance with the rotational phases of respective rotors.

SUMMARY OF THE INVENTION

However the prior-art control device still requires improvements to the efficiency of the rotating electrical machine and the efficiency of the inverter in order to prevent the generation of heat.

It is therefore an object of this invention to improve the efficiency of a system which includes a plurality of rotating electrical machines and a control device having a single inverter for supplying a composite current for the plurality of rotating electrical machines.

In order to achieve above object, this invention provides a control device for a rotating electrical machine system having a plurality of rotating electrical machines, the rotation of each rotating electrical machine being controlled by a current flowing in response to the rotational phase of a rotor thereof, the control device comprising a single current control circuit which is connected to the plurality of rotating electrical machines and produces a composite current comprising the current for each rotating electrical machine; and a controller.

The controller functions to set an operating point of at least one rotating electrical machine; set an operating point of the other rotating electrical machine in response to the set operating point so that either the efficiency of the current control circuit or the overall efficiency with respect to all of the rotating electrical machines and the current control circuit is maximized; set the current for each rotating electrical machine based on the set operating points of all the rotating electrical machines; and control the current control circuit so that the current control circuit produces the composite current for all rotating electrical machines.

The details as well as other features and advantages of this invention are set forth in the remainder of the specification and are shown in the accompanying drawings.

DESCRIPTION OF THE PREFERRED EMBODIMENTS

Although the embodiments of the invention below are described with reference to a rotating electrical machine system of a hybrid vehicle, the application of the invention is not limited to that rotating electrical machine system.

Figure 1:
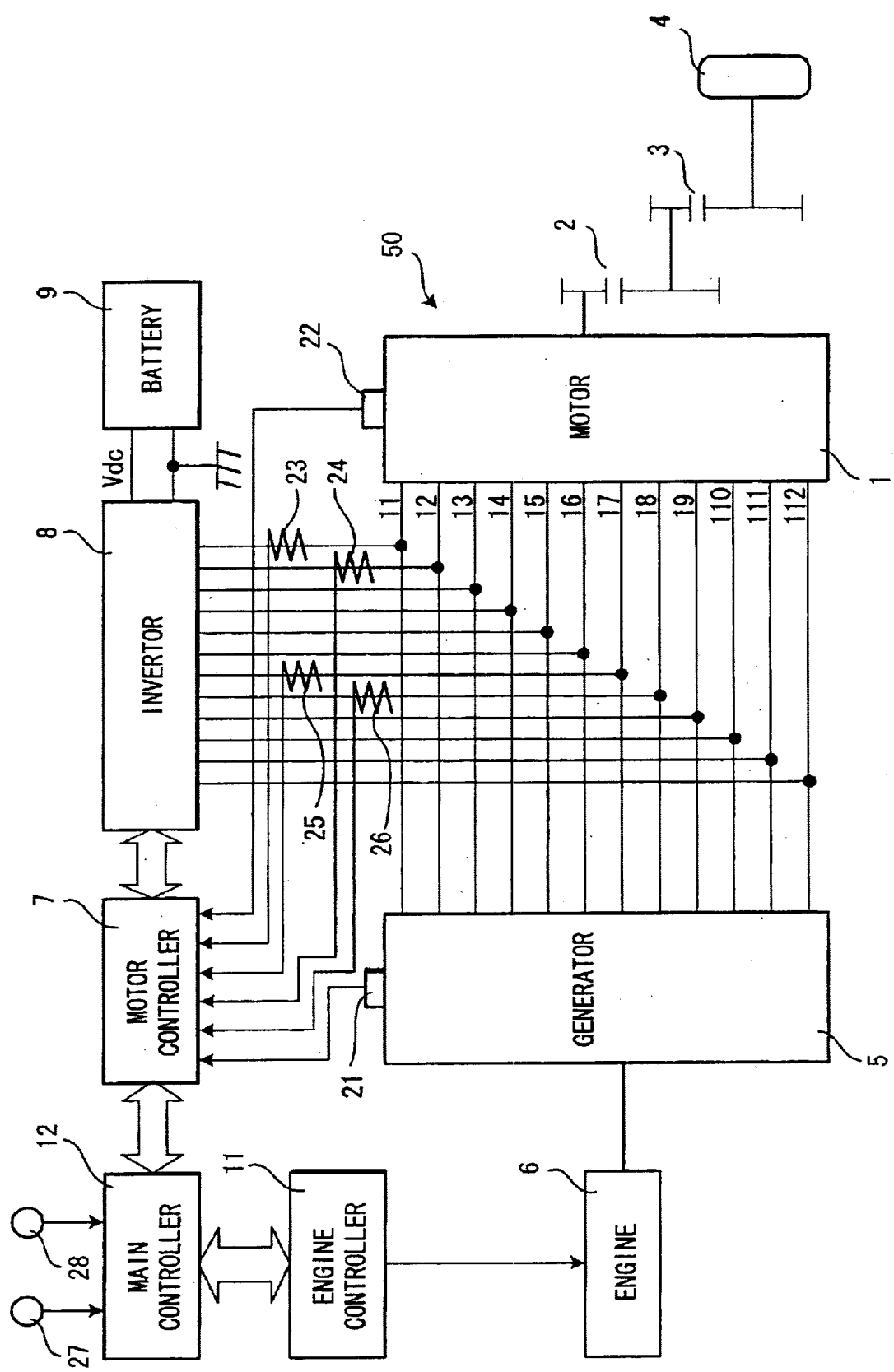
FIG. 1 is a schematic diagram of a rotating electrical machine system including a control device according to this invention.

Referring to FIG. 1, a rotating electrical machine system 50 embodying this invention comprises a plurality of rotating electrical machines and an inverter 8. The rotating electrical machines comprise an electric motor 1 and a generator 5. The electric motor 1 is connected to the drive wheels 4 through a reduction gear set 2 and a differential gear 3. The electric motor 1 may produce electricity when regenerating power. The generator 5 is connected to and driven by the engine 6. The generator 5 may act as an electric motor to start the engine.

The electric motor 1 is an interior permanent magnet (IPM) type motor provided with a stator having four three-phase coil units and a rotor with four pairs of magnetic poles. The electric motor 1 is driven by a three-phase alternating electric current. The generator 5 is an interior permanent magnet (IPM) type generator provided with a stator having three four-phase coil units and a rotor with three pairs of magnetic poles.

Figure 2:
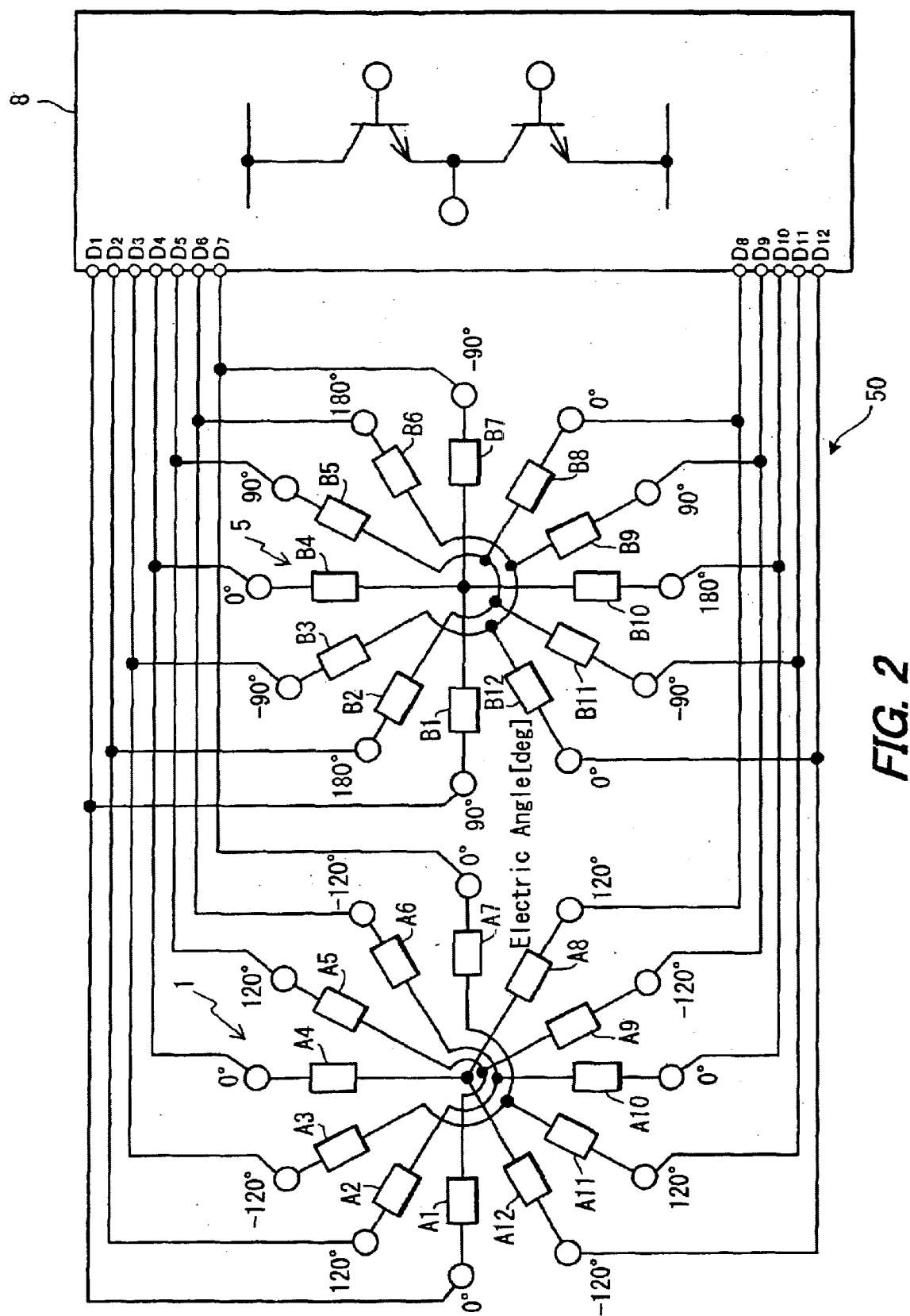
FIG. 2 is a connection diagram showing the connections between an inverter and each stator coil in a rotating electrical machine system including a control device according to this invention.

Referring to FIG. 2, the electric motor 1 has four three-phase coil units (A1, A5, A9) (A2, A6, A10) (A3, A7, A11) (A4, A8, A12). The generator 5 has three four-phase coil units (B1, B4, B7, B10) (B2, B5, B8, B11) (B3, B6, B9, B12). The twelve-phase inverter 8 supplies a current to the stator coils of the two rotating electrical machines. This current is a composite current comprising the three-phase current flowing in the electric motor 1 which has twelve coils A1–A12 and the four-phase current flowing in the generator 5 which has twelve coils B1–B12.

When the three-phase alternating current is represented as (Iu, Iv, Iw) and the four-phase alternating current is represented as (Ia, Ib, Ic, Id), the twelve composite currents I1–I12 at the output terminals D1–D12 of the inverter 8 can be written as shown below. Since both the electrical angle between Ia and Ic and the electrical angle between Ib and Id are 180 degrees, that is to say, since Ic=−Ia and Id=−Ib, Ic can be re-written as −Ia and Id can be re-written as −Ib in Equations (2), (3), (6), (7), (10) and (11).

$$I1 = Iu + Ib \tag{1}$$

$$I2 = Iv - Ia \tag{2}$$

$$I3 = Iw - Ib \tag{3}$$

$$I4 = Iu + Ia \tag{4}$$

$$I5 = Iv + Ib \tag{5}$$

$$I6 = Iw - Ia \tag{6}$$

$$I7 = Iu - Ib \tag{7}$$

$$I8 = Iv + Ia \tag{8}$$

$$I9 = Iw + Ib \tag{9}$$

$$I10 = Iu - Ia \tag{10}$$

$$I11 = Iv - Ib \tag{11}$$

$$I12 = Iw + Ia \tag{12}$$

A composite current (I1–I12) representing the combination of the three-phase alternating current (Iu, Iv, Iw) and the four-phase alternating current (Ia, Ib, Ic, Id) is generated by the inverter 8 and applied from the output terminals (D1–D12) to the electric motor 1 and the generator 5. However the three-phase alternating current (Iu, Iv, Iw) flows only in the electric motor 1 and the four-phase current (Ia, Ib, Ic, Id) only flows in the generator 5.

This is for the following reason. The coils B1, B4, B7, B10 are electrically connected respectively to the inverter output terminals D1, D4, D7, D10 used for the composite currents I1, I4, I7, I10 which contain the three-phase current component Iu. However since the four-phase coils (B1, B4, B7, B10) are respectively connected at a single point, the current component Iu of the three-phase alternating current does not flow in the generator 5.

The coils B2, B5, B8, B11 are electrically connected respectively to the inverter output terminals D2, D5, D8, D11 used for the composite currents I2, I5, I8, I11 which contain the three-phase current component Iv. However since the four-phase coils (B2, B5, B8, B11) are respectively connected at a single point, the current component Iv of the three-phase alternating current does not flow in the generator 5.

The coils B3, B6, B9, B12 are electrically connected respectively to the inverter output terminals D3, D6, D9, D12 used for the composite currents I3, I6, I9, I11 which contain the three-phase current component Iw. However since the four-phase coils (B3, B6, B9, B12) are respectively connected at a single point, the current component Iw of the three-phase alternating current does not flow in the generator 5.

The coils A1, A5, A9 are electrically connected respectively to the inverter output terminals D1, D5, D9 used for the composite currents I1, I5, I9 which contain the four-phase current component Ib. However since the three-phase coils (A1, A5, A9) are respectively connected at a single point, the current component Ib of the four-phase current does not flow in the electric motor 1.

In the same manner, the current component Ic (=−Ia) of the four-phase alternating current does not flow in the electric motor 1 because the four-phase coils (A2, A6, A10) are connected at a single point. The current component Id (=−Ib) of the four-phase alternating current does not flow in the electric motor 1 because the three-phase coils (A3, A7, A11) are connected at a single point. The current component Ia of the four-phase alternating current does not flow in the electric motor 1 because the three-phase coils (A4, A8, A12) are connected at a single point.

The above type of method of connection between the inverter 8 and the respective rotating electrical machines realizes an arrangement in which the current flowing in one rotating electrical machine does not flow into the other rotating electrical machine.

It is possible to calculate the current components Iu, Iv, Ib, Ia from the equations below by calculating Equation (1)+ Equation (7), Equation (2)+Equation (8), Equation (1)− Equation (7), and Equation (2)−Equation (8).

The detection of the current components will be described below. The lower limiting number of current sensors is four and it is possible to perform detection of all currents using only four current sensors. The components Iu, Iv, Ia, Ib of the three-phase or four-phase current can be calculated from the equations below.

$$Iu = (I1 + I7)/2 \tag{13}$$

$$Iv = (I2 + I8)/2 \tag{14}$$

$$Ib = (I1 - I7)/2 \tag{15}$$

$$Ia = (I2 - I8)/2 \tag{16}$$

One component Iw of the three-phase current is calculated from the following equation.

$$Iw = -(Iu + Iv) \tag{17}$$

In this manner, if only four values (I1, I7, I2, I8) of the twelve composite currents are detected, the actual three-phase or four-phase current components (Iu, Iv, Iw, Ia, Ib, Ic, Id) are calculated from Equation (13) to Equation (17).

The motor controller 7 performs a known vector control. The motor controller 7 provided with a microcomputer determines a d-axis current command value Idm* and a q-axis current command value Iqm* for the electric motor 1 as well as a d-axis current command value Idg* and a q-axis current command value Iqg* for the generator 5. The microcomputer of the motor controller 7 is provided with a central processing unit (CPU), a read-only memory (ROM), a random access memory (RAM), and an input/output interface (I/O interface). The motor controller 7 calculates the actual d-axis current and the q-axis current for the electric motor 1 and the generator 5, using the actual current components Iu, Iv, Ib, Ia obtained from the detection signals of current sensors 23, 24, 25, 26 and signals from a sensor 21 for detecting the rotational angle of the generator 5 and a sensor 22 for detecting the rotational angle of the electric motor 1.

The motor controller 7 calculates a d-axis current correction which is the difference between the actual d-axis current and the d-axis current command and a q-axis current correction which is the difference between the actual q-axis current and the q-axis current command. An alternating current voltage command value for each rotating electrical machine is generated by performing a 2-phase-3-phase/2-phase-4-phase coordinate conversion on the d-axis and q-axis current corrections. The motor controller 7 generates a composite voltage command by combining the voltage commands for each rotating electrical machine in order to generate a PWM signal from the carrier signal and the composite voltage command. The PWM signal is transmitted to an inverter 8 which acts as a current control circuit for the electric motor 1 and the generator 5. The magnitude of the current vector in the d–q coordinates calculated for each rotating electrical machine by the current vector control method corresponds to the magnitude of the peak of the alternating current for each rotating electrical machine.

The engine controller 11 is provided with a microcomputer and controls the ignition timing, the fuel injection amount and the intake air amount so that the engine rotation speed and torque coincide with a target rotation speed Ne* and a target engine torque Te*. The microcomputer of the engine controller 11 is provided with a central processing unit (CPU), a read-only memory (ROM), a random access memory (RAM), and an input/output interface (I/O interface).

The main controller 12 is provided with a microcomputer. The microcomputer of the main controller 12 is provided with a central processing unit (CPU), a read-only memory (ROM), a random access memory (RAM), and an input/output interface (I/O interface). The main controller 12 sets the target operating point of the engine (Ne*, Te*), the target operating point ($\omega$m, Tm*) of the electric motor 1 and the target operating point ($\omega$g*, Tg*) of the generator 5 based on an accelerator position APS and a vehicle speed VSP. An accelerator position sensor 28 detects the accelerator position APS and a vehicle speed sensor 27 detects the vehicle speed VSP. The setting of the target operating point ($\omega$m, Tm*) of the electric motor 1 consists of obtaining a rotational angular velocity $\omega$m from the vehicle speed VSP and a target torque Tm* of the electric motor 1. The setting of the target operating point ($\omega$g*, Tg*) of the generator 5 consists of setting a target rotational angular velocity $\omega$g* and a target torque Tg* of the generator 5. The setting of the operating point (Ne*, Te*) of the engine 6 consists of setting a target rotation speed Ne* and a target torque Te* for the engine 6.

The main controller 12 and the motor controller 7 may be integrated into a single controller.

Referring to the control block diagram in FIG. 3, further aspects of the control performed by the main controller 12 and the motor controller 7 will be described. In the control block diagram, the units 31–36 are virtual units utilizing the functions of the microcomputer provided in the main controller 12. The current command value computing unit 37 is a virtual unit utilizing the functions of the microcomputer in the motor controller 7.

The calculation unit 31 calculates a target torque To of the shaft mounting the drive wheels by looking up a first map on the basis of the vehicle speed VSP and the accelerator position APS. The first map is shown in the calculation unit 31 in FIG. 3 and is stored in the microcomputer of the main controller 12. The division unit 32 calculates a target torque Tm* of the electric motor 1 by dividing the target torque To by the overall gear ratio gr of the reduction gear set 2 and the differential 3. The calculation unit 33 calculates the rotational angular velocity $\omega$m of the electric motor 1 from the equation $\omega$m=VSP×gr/Rtire. Herein Rtire is the radius of the drive wheels.

The multiplication unit 34 calculates the product of the target torque To and the rotational angular velocity $\omega$m as a drive output Po of the electric motor 1. The division unit 35 creates the target output Po* of the generator 5 by dividing the value for Po by the combined efficiency $\eta$ of the motor and the inverter. This process allows for compensation of power loss in the motor and inverter.

In order to maximize the efficiency of the inverter 8, the operating point determination unit 36 determines an operating point ($\omega$gm, Tgm) of the generator 5 which minimizes the current average value of the composite current flowing in the inverter 8 when the generator 5 is operated at the target output Po*. In the first embodiment, the operating point determination unit 36 sets the rotational angular velocity and the torque at that operating point as a target rotational angular velocity $\omega$g* and a target torque Tg* for the generator 5. Hereafter the operating point at which the current average value of the composite current is minimized is referred to as the current minimization operating point.

Figure 4:
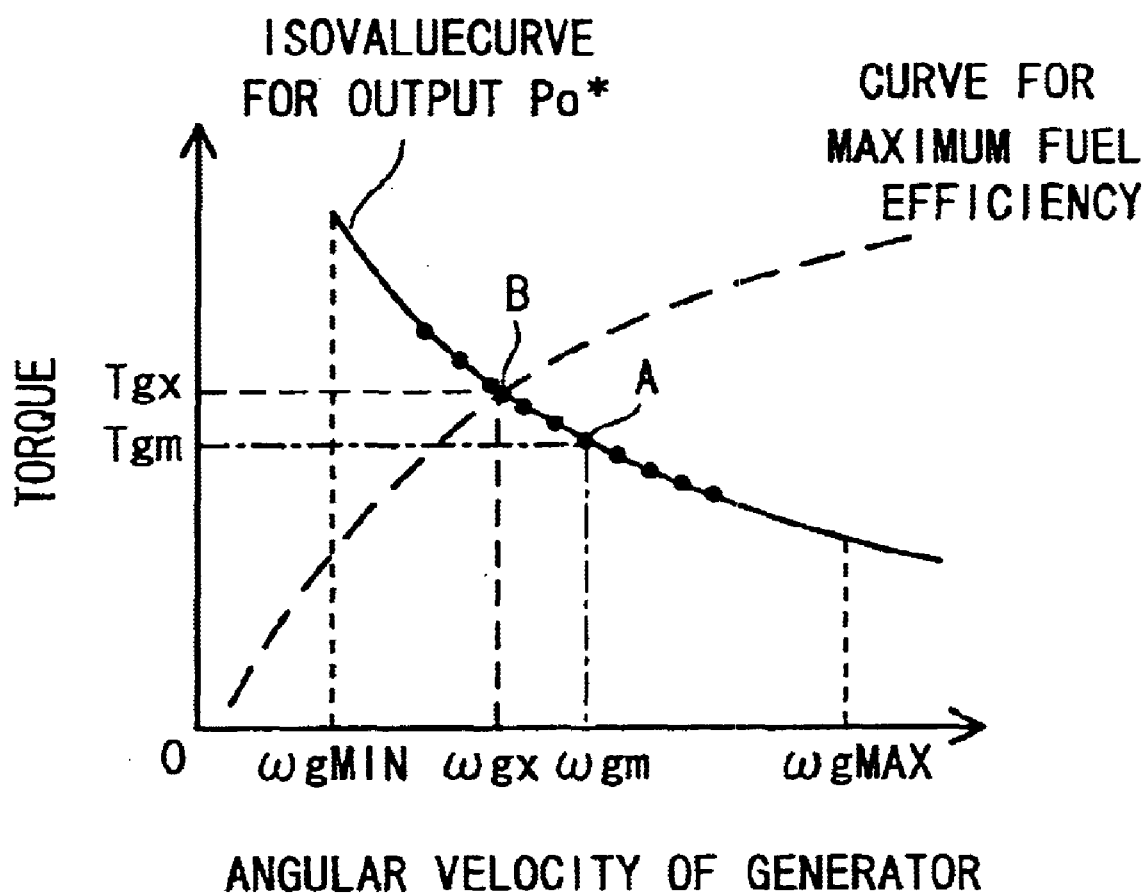
FIG. 4 is a map specifying the relationship between the rotational angular velocity and torque of the generator.

The second map shown in FIG. 4 is a map specifying the relationship between the torque and rotational angular velocity in the generator 5. The second map is stored in the microcomputer of the main controller 12. Referring to FIG. 4, the curve on which the output of the generator 5 takes the target output Po* (hereafter referred to as "isovalue curve for output") are represented as a curved solid line. A target output Po* is obtained at any point on the isovalue curve for output. However a difference in the torque or the rotational angular velocity of the generator 5 results in a difference in the current average value of the composite current flowing through the inverter 8. Further, it is sometimes the case that the peak value for the composite current exceeds the permitted range of the inverter 8. The operating point determination unit 36 searches for an operating point ($\omega$gm, Tgm) which minimizes the current average value of the composite current flowing through the inverter 8 on the isovalue curve for output. The operating point of the generator 5 is a point on the plane comprising the coordinate axes of torque and rotational angular velocity for the generator 5. Selecting an operating point which minimizes the current average value of the composite current maximizes the efficiency of the inverter 8.

Operating points are set at a predetermined interval $\Delta\omega$ of 100 rpm between the possible minimum value $\omega$gMIN and the possible maximum value $\omega$gMAX for the rotational angular velocity of the generator 5. A value J in an evaluation function described hereafter is calculated at each operating point set between the minimum value $\omega$gMIN and the maximum value $\omega$gMAX. The operating point determination unit 36 sets a current minimization operating point on the basis of a set operating point of the generator 5 which minimizes the value J in the evaluation function. For example, the operating point determination unit 36 determines the point A to be the current minimization operating point ($\omega$gm, Tgm) in FIG. 4. The operating point determination unit 36 sets the rotational angular velocity and the torque at the point A as the target rotational angular velocity $\omega$g* and the target torque Tg* of the generator 5.

The current command value computing unit 37 for the d·q axis current command uses the restricting conditions in Equations (18)–(25) below in order to determine the d-axis current Idm and q-axis current Iqm of the electric motor 1 as well as the d-axis current Idg and q-axis current Iqg of the generator 5 which minimize the evaluation function Jp in Equation (26). These values are calculated on the basis of the target rotational angular velocity $\omega$g* and the target torque Tg* of the generator 5 and the rotational angular velocity ωm and the target torque Tm* of the electric motor 1. The current command value computing unit 37 for the d·q axis current command sets the four determined values to the motor controller 7 as d, q-axis current command values Idm*, Iqm*, Idg*, Iqg*.

Figure 5:
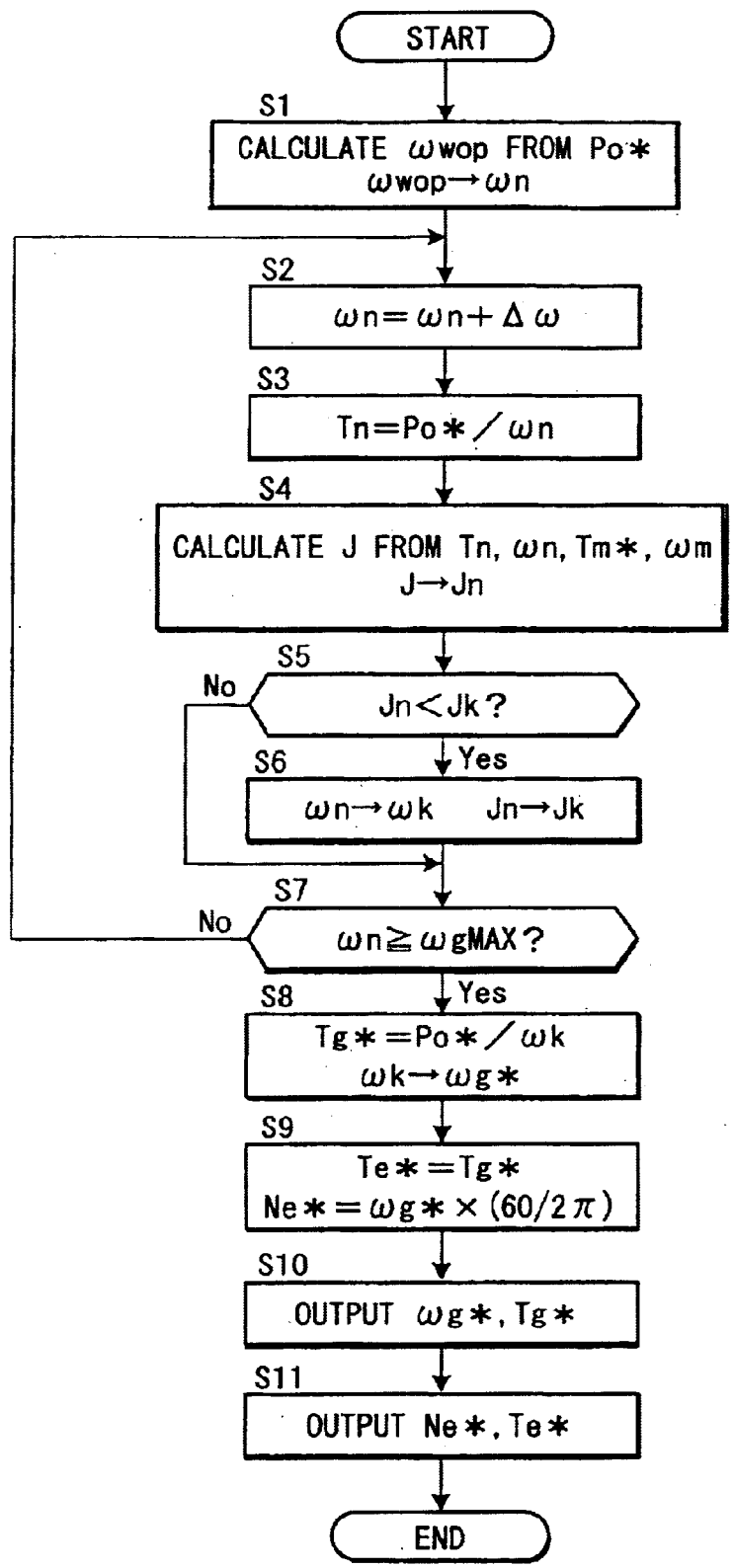
FIG. 5 is a flowchart describing a routine for determining the operating point of the generator which is performed by the controller according to the first embodiment.

Referring to the flowchart in FIG. 5, the function of the operating point determination unit 36 which is realized by the microcomputer of the main controller 12 will be described in detail. The operating point determination unit 36 corresponds to the routine as shown in FIG. 5 which is executed by the microcomputer of the main controller 12. The routine shown in FIG. 5 determines the current minimum operating point and sets the target torque Tg* and the target rotational angular velocity ωg* of the generator 5.

Figure 6:
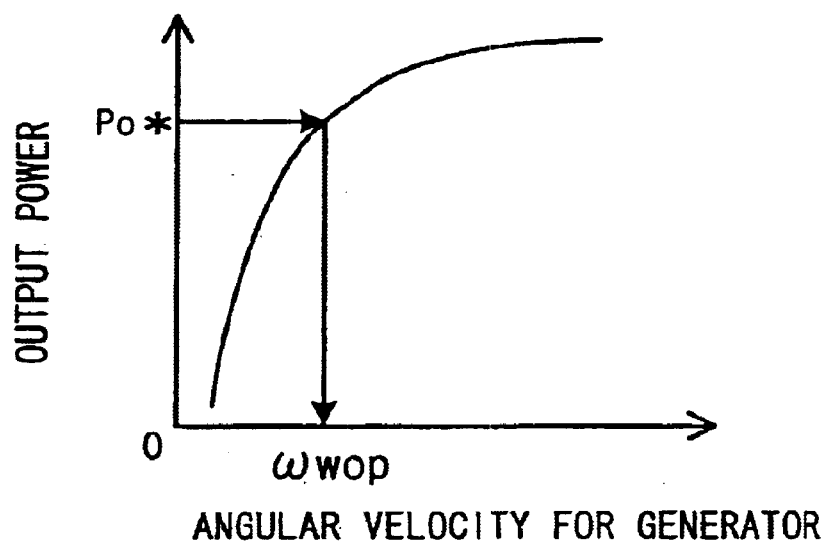
FIG. 6 is a map specifying the relationship between the rotational angular velocity and output of the generator when the throttle is fully open.

In a step S1, the rotational angular velocity ωwop of the generator 5 when operated at a target output Po* with the throttle for the engine 6 fully open is calculated based on the target output Po*. The rotational angular velocity ωwop is the possible minimum value ωgMIN of the generator 5 when operated at a target output Po*. The calculation is performed by referring to the output characteristics of the generator 5 in the third map shown in FIG. 6. The generator 5 takes the output characteristics under the condition that the throttle for the engine 6 is fully open. The third map shown in FIG. 6 is stored in the microcomputer of the main controller 12. Thereafter the value of the rotational angular velocity ωwop is assigned to the variable ωn for the rotational angular velocity.

In a step S2, an increment Δω for the rotational angular velocity is added to the variable ωn in order to update the variable ωn for the rotational angular velocity. In a step S3, torque Tn is calculated by dividing the target output Po* by the rotational angular velocity ωn.

In a step S4, the d-axis current and q-axis current of the electric motor 1 as well as the d-axis current and q-axis current of the generator 5 are determined based on the torque Tn and the rotational angular velocity ωn of the generator 5 and the target torque Tm* and rotational angular velocity ωm of the electric motor 1. The values for the d-axis currents and q-axis currents satisfy all of Equations (18) to (25) and minimize the evaluation function Jp in Equation (26). In addition, a value of J, which is a minimum value of the evaluation function Jp at the time when the rotation angular velocity of the generator is ωn and the torque is Tn, is calculated. The calculated value J for the evaluation function Jp is assigned to the variable Jn. The evaluation function Jp displays a one-to-one correspondence with the current average value Iac for the composite current.

$$Vdm = Rm \times Idm - pm \times \omega m \times Lqm \times Iqm \tag{18}$$

$$Vqm = pm \times \omega m \times Ldm \times Idm - Rm \times Iqm + pm \times \omega m \times \phi mm \tag{19}$$

$$Vdg = Rg \times Idg - pg \times \omega g \times Lqm \times Iqg \tag{20}$$

$$Vqg = pg \times \omega g \times Ldm \times Ipg - Rg \times Iqg + pg \times \omega g \times \phi mg \tag{21}$$

$$Tm = pm \times \{\phi mm \times Iqm - (Lqm - Ldm)\} \times Idm \times Iqm \tag{22}$$

$$Tg = pg \times \{\phi mg \times Iqg - (Lqg - Ldg)\} \times Idg \times Iqg \tag{23}$$

$$Vdc^2 \geq Vdm^2 + Vqm^2 + Vdg^2 + Vqg^2 \tag{24}$$

$$Io^2 \geq idm^2 + Iqm^2 + Idg^2 + Iqg^2 \tag{25}$$

$$Jp = k \times \{(Idm^2 + Iqm^2)^{1/2} + (Idg^2 + Iqg^2)^{1/2}\} \tag{26}$$

$$k = f((Idm^2 + Iqm^2)^{1/2} / (Idg^2 + Iqg^2)^{1/2})) \tag{27}$$

Where:

Vdm=d-axis voltage for electric motor

Vqm=q-axis voltage for electric motor

Vdg=d-axis voltage for generator

Vqg=q-axis voltage for generator

Idm=d-axis current for electric motor

Iqm=q-axis current for electric motor

Idg=d-axis current for generator

Iqg=q-axis current for generator

Tm=torque of electric motor (=Tm*)

Tg=torque of generator (=Tg*)

ωm=rotational angular velocity of electric motor

ωg=rotational angular velocity of generator

Rm=resistance of electric motor

Rg=resistance of generator

Ldm=d-axis inductance of electric motor

Lqm=q-axis inductance of electric motor

Ldg=d-axis inductance of generator

Lqg=q-axis inductance of generator

φmm=electromagnetic flux of electric motor

φmg=electromagnetic flux of generator pm=number of pole pairs in electric motor pg=number of pole pairs in generator Vdc=DC voltage (battery voltage)

Io=sum of current vectors

Jp=evaluation function k=coefficient for taking into account reduction effect on current average value as a result of combining currents The evaluation function Jp in Equation (26) is derived in the following manner.

The poly-phase alternating current is represented by sinusoidal waves with different phases in each rotating electrical machine. However the current for only one phase I of the poly-phase alternating current is shown by the equation below.

$$I = Ip \times \sin(\omega t) \tag{28}$$

Where:

Ip=peak current value

ω=angular velocity t=time

The current average value Iave of the control current I is given by the equation below.

$$Iave = 2 \times Ip / \pi \tag{29}$$

Since the length of the current vector on the d-q axis plane represents the magnitude of the current peak value, the following relationship is established.

$$Iave = 2 \times (id^2 + iq^2)^{1/2} / \pi \tag{30}$$

Thus the expression $id^2 + iq^2$ on the right side of the equation should be minimized in order to minimize the current average value Iave of the control current I.

The research carried out by the present inventors has shown that a current average value Icomave for the composite current Icom (=Im+Ig) which combines the current Im flowing in one rotating electrical machine and the current Ig flowing in the other rotating electrical machine is smaller than the sum Iavem+Iaveg of the current average values of each current Im, Ig before combining the currents. The reduction ratio is determined in response to the ratio Ipm/Ipg of the magnitudes of the current peak of each current Im, Ig before combining the currents. The reduction ratio increases as this ratio approaches Ipm/Ipg a value of one.

To describe this point in further detail, the coefficient k is defined by the following equation.

$$k = Icomave/(Iavem+Iaveg) \quad (31)$$

The coefficient k is expressed by the equation below.

$$k = f(Ipm/Ipg) \quad (32)$$
$$= f\left((Idm^2 + Iqm^2)^{1/2} / (Idg^2 + Iqg^2)^{1/2}\right)$$

Using k, the current average value Icomave for the composite current Icom is expressed as Equation (33).

$$Icomave = 2 \times k \times \{(Idm^2+Iqm^2)^{1/2}+(Idg^2+Iqg^2)^{1/2}\}/\pi \quad (33)$$

The variable excluding the constant on the right side of the equation represents the evaluation function Jp in Equation (26).

The evaluation function Jp is not limited to the form of Equation (26) and may take the following form.

$$Jp = AVE\{(Idm^2+Iqm^2)^{1/2}+(Idg^2+Iqg^2)^{1/2}\} \quad (34)$$

$$Jp = PEAK\{(Idm^2+Iqm^2)^{1/2}+(Idg^2+Iqg^2)^{1/2}\} \quad (35)$$

The symbols AVE, PEAK represent the calculation of the average and maximum values for the values in the brackets which are placed further to the right.

In a step S5 in the flowchart in FIG. 5, the value for the variable Jn is compared with a value Jk. The initial value of the variable Jk is set to a maximum value or an extremely large value. When Jn is smaller than Jk, the routine proceeds to a step S6 where the value for ωn is assigned to the variable ωk and the value for Jn is assigned to the variable Jk.

In a step S7, the value for ωn is compared with the maximum value ωgMAX. When ωn is smaller than ωgMAX, the routine returns to the step S2 and repeats the process in the steps S2 to S7. The repetition of these steps means that the value ωgm for the rotational angular velocity, for which the value J of the evaluation function takes a minimum value at the generator output of Po*, is assigned to variable ωk.

The steps S2 to S7 are repeated until the calculation of the value J in the evaluation function for all set operating points is completed. In the step S7, when ωn is greater than or equal to ωgMAX, the routine proceeds from the step S7 to the step S8. In the step S8, the value resulting from dividing the target output Po* by the value for ωk, that is to say, Po*/ωgm, is set as the target torque Tg* for the generator 5. This is in order to make the target output Po* correspond with the power required for the generator 5. Furthermore, the value ωk, which is currently ωgm, is assigned to the target rotational angular velocity ωg*.

In a step S9, the target torque Te* and the target rotation speed Ne* of the engine are set. That is to say, the value for Tg* is assigned to the target torque Te* of the engine. Furthermore the target rotation speed Ne* [rpm] is calculated from the equation Ne*=ωg*×(60/2π). Since power generation loss is ignored, the output corresponding to the loss in the generator 5 is not added to the engine output.

In the steps S10 and S11, the target rotational angular velocity ωg* and the target torque Tg* of the generator 5 are outputted to the current command value computing unit 37 and the target torque Te* and target rotational angular velocity Ne* for the engine are outputted to the engine controller 11 shown in FIG. 1.

As described above, after setting the target operating point for one rotating electrical machine, that is to say, for the electric motor 1 based on the accelerator position APS and the vehicle speed VSP, a target operating point for the other rotating electrical machine, that is to say, for the generator 5 is set so that the efficiency of the inverter 8 is maximized. That is to say, the composite current flowing in the inverter 8 is minimized. In this manner, it is possible to minimize switching loss in the switching element in the inverter 8 or minimize copper loss in sections in which the composite current flows in the inverter 8 while retaining the motor target output Po*.

Figure 7:
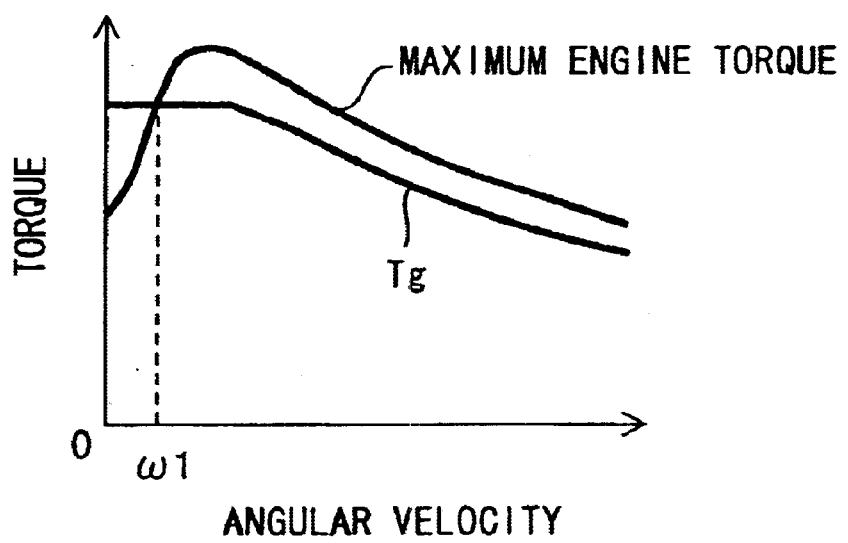
FIG. 7 is a graph describing the variation in engine torque and generator torque with respect to rotational angular velocity.

In the first embodiment, within the overall rotational angular velocity range of the generator 5, the target operating point (ωg*, Tg*) of the generator 5 is set to the operating point A (ωgm, Tgm) at which the composite current of the inverter 8 is minimized. However in regions in which the rotational angular velocity of the generator 5 (=rotational angular velocity of the engine) is smaller than a predetermined value ω1, this setting may be prohibited. This is for the following reason. Referring to FIG. 7, when the rotational angular velocity of the generator 5 (=rotational angular velocity of the engine) is smaller than the predetermined value ω1, the maximum engine torque Temax is less than the torque Tg of the generator 5. In this case, the generator 5 cannot generate the required power. As a result, when the maximum engine torque Temax is less than the torque Tg of the generator 5, it is preferred to terminate the control which determines the current minimization operating point and maximizes the efficiency of the inverter 8.

In the first embodiment, the value J for the evaluation function is not calculated when the rotational angular velocity has a minimum value of ωgMIN (=ωwop). However the value J for the evaluation function may be calculated when the rotational angular velocity has a minimum value of ωgMIN.

Furthermore in the first embodiment, the two rotating electrical machines 1, 5 have their respective stators. However it is also possible to apply the invention to a rotating electrical machine system 50 in which two rotating electrical machines coaxially disposed use a single stator in common.

Figure 8:
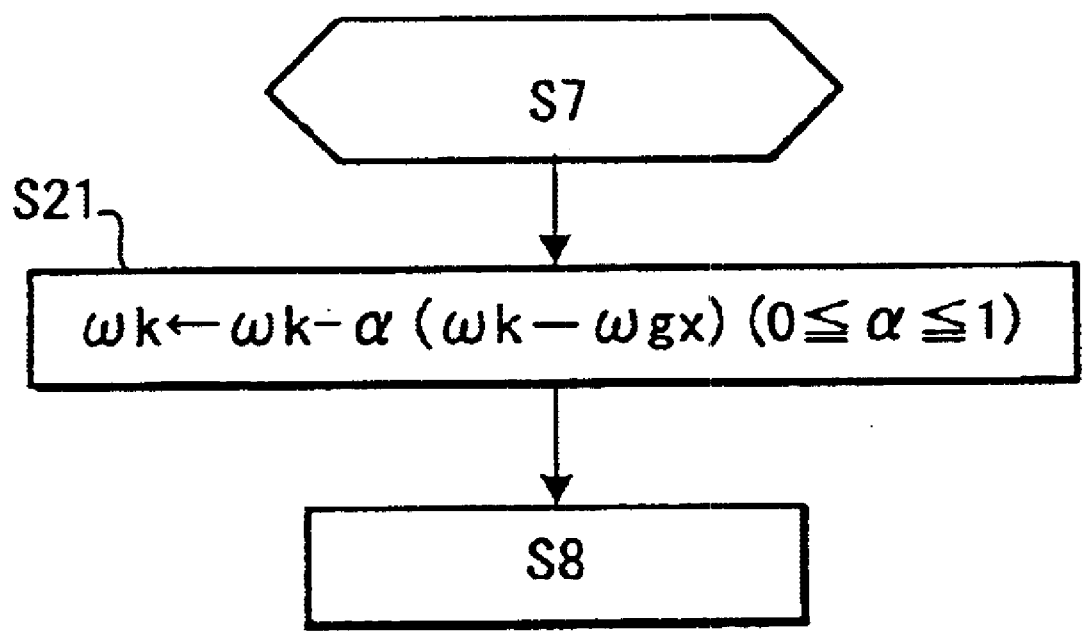
FIG. 8 is a flowchart describing a routine for determining the operating point of the generator which is performed by the controller according to the second embodiment.

Referring to the flowchart in FIG. 8, a second embodiment of this invention will be described. The second embodiment is similar to the first embodiment. However the main controller 12 further has functions of determining an operating point B (ωgx, Tgx) of the generator at which optimal engine fuel economy is attained, in addition to determining an operating point A (ωgm, Tgm) of the generator at which the current average value of the composite current is minimized, and set the current for each rotating electrical machine based on the two determined operating points of the generator.

In the second embodiment, the target operating point (ωg*, Tg*) of the generator 5 is set so that the efficiency of the inverter 8 is within an efficiency range in which maximum efficiency represents an upper limit. The upper limit of the efficiency range is efficiency at the current minimization operating point A (ωgm, Tgm) of the generator 5 as described above. The lower limit of the predetermined range is the efficiency at the operating point B (ωgx, Tgx) of the generator 5 where the engine 6 for driving the generator 5 exhibits maximum fuel efficiency. The operating point B (ωgx, Tgx) is determined based on the target output Po* using the second map as shown in FIG. 4.

Referring to the second map in FIG. 4, the broken line represents the optimal fuel efficiency curve and the operating point B (ωgx, Tgx) of the generator 5 is an intersection point of the isovalue curve for output Po* with the optimal fuel efficiency curve. Operating points lying on the isovalue curve for output between the operating point B ($\omega$gx, Tgx) of the generator 5 at maximum fuel efficiency and the current minimization operating point ($\omega$gm, Tgm) are set as target operating points. Referring to the flowchart in FIG. 8, a new step S21 is provided between the step S7 and the step S8 in FIG. 5.

In the step S21, the variable $\omega$k is updated to ($\omega$k-$\alpha$($\omega$k-$\omega$gx)). Herein $\alpha$ is a value from 0 to 1. That is to say, $0 \leq \alpha \leq 1$. When the control loop comprising the steps S2 to S7 is completed, the variable $\omega$k has a value of $\omega$gm ($\omega$k=$\omega$gm). Therefore, a value between $\omega$gx and $\omega$gm is assigned as the variable $\omega$k in the step S21.

Thus an operating point is for the generator 5 is provided on the Po* isocurve between A ($\omega$gm, Tgm) and B ($\omega$gx, Tgx). Although the current average value of the composite current flowing through the inverter 8 does not take a minimum value, it is possible to improve fuel efficiency of the engine 6 and it is possible to improve the overall efficiency of the rotating electrical machine system 50 connected to the engine.

The operating point of the generator 5 may be switched between the current minimization operating point A and the optimal fuel efficiency operating point B in response to the operating condition of the inverter 8. For example, since the composite current flowing through the inverter 8 increases under high load, a current minimization operating point A may be selected in high load regions by setting $\alpha$ to 0. In other operating regions, the optimal fuel efficiency operating point B may be selected by setting $\alpha$ to 1.

Figure 9:
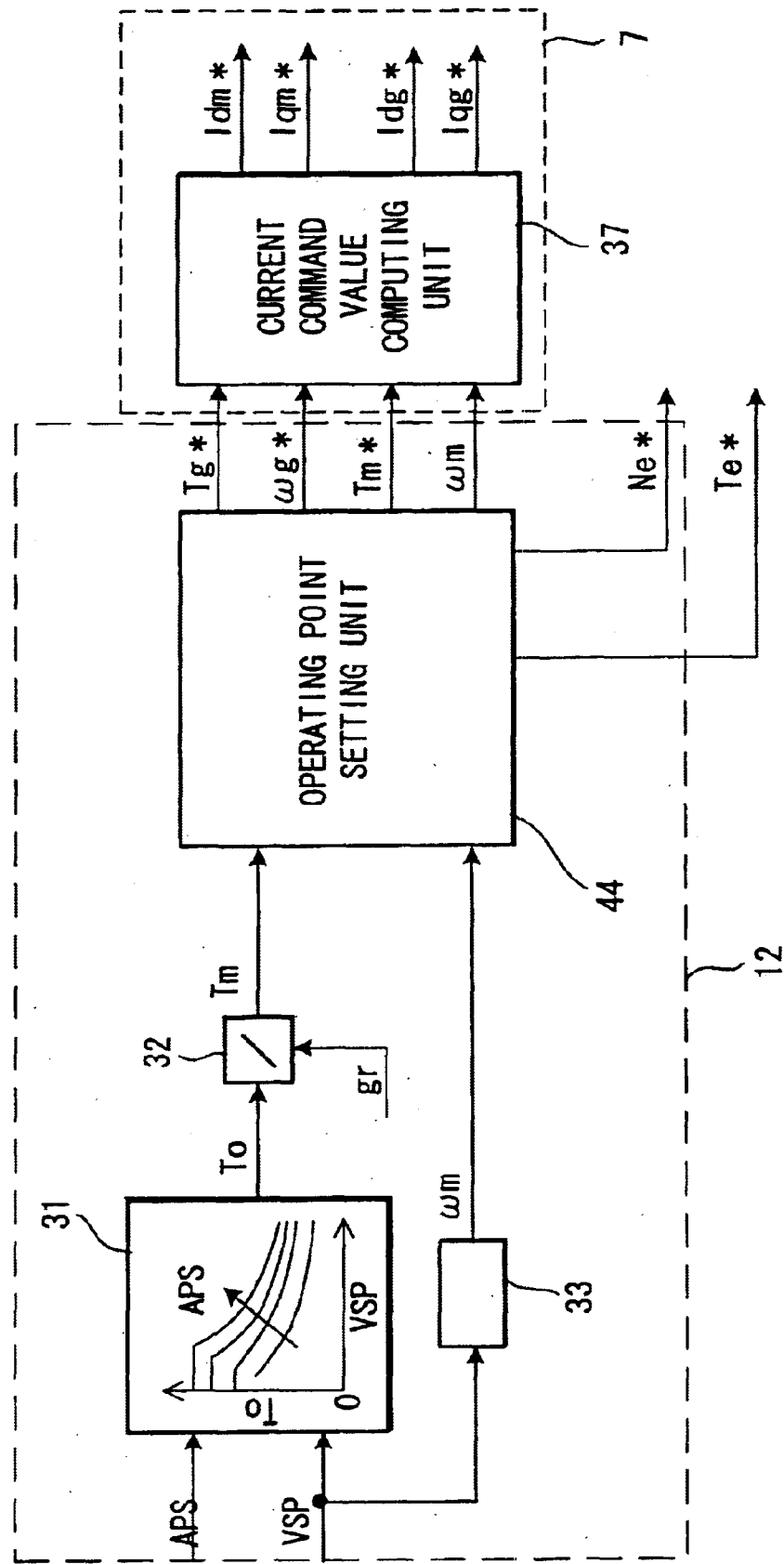
FIG. 9 is a block diagram showing control performed by a controller according to a third embodiment of this invention.

Referring to FIG. 9, a third embodiment of this invention will be described. The control block diagram in FIG. 9 will be referred to in order to describe control performed by the motor controller 7 and the main controller 12 according to the third embodiment. In the control block diagram, the operating point setting unit 44 is a virtual unit which is constructed from the functions of the microcomputer of the main controller 12. Those units which are the same as those described with reference to FIG. 3 are denoted by the same reference numerals and additional description is omitted.

The third embodiment maximizes the overall efficiency $\eta$total of the rotating electrical machine system 50. The overall efficiency $\eta$total of the rotating electrical machine system 50 is the product of the efficiency $\eta$m of the motor not including inverter loss, the efficiency $\eta$g of the generator not including the inverter loss and the efficiency $\eta$inv of the inverter 8 and can be represented as $\eta$m×$\eta$g×$\eta$inv. Since the output used by the electric motor 1 (gr·Tm·$\omega$m/$\eta$total) is supplied from the output (Tg*·$\omega$g*) of the generator 5, the following relationship is established.

$$gr \cdot Tm \cdot \omega m / \eta total = Po^* = Tg^* \cdot \omega g^* \quad (41)$$

The operating point ($\omega$m, Tm) of the electrical motor 1 is determined from vehicle speed VSP and accelerator position APS by the calculation units 31 and 33. The overall gear ratio gr corresponds to the speed change ratio. The operating point setting unit 44 in FIG. 9 selects a target operating point ($\omega$g*, Tg*) of the generator so that the overall efficiency $\eta$total is maximized, from the operating points which satisfy Equation (41) at a given generator target output Po*.

In the first embodiment, the torque Tm of the electric motor 1 calculated by the calculation unit 31 is used without modification as the target torque Tm* of the electric motor 1. However in the third embodiment, the efficiency $\eta$m of the electric motor 1 is calculated and the torque Tm of the electric motor is divided by the motor efficiency $\eta$m in order to calculate the target torque Tm* of the electric motor 1.

Figure 10:
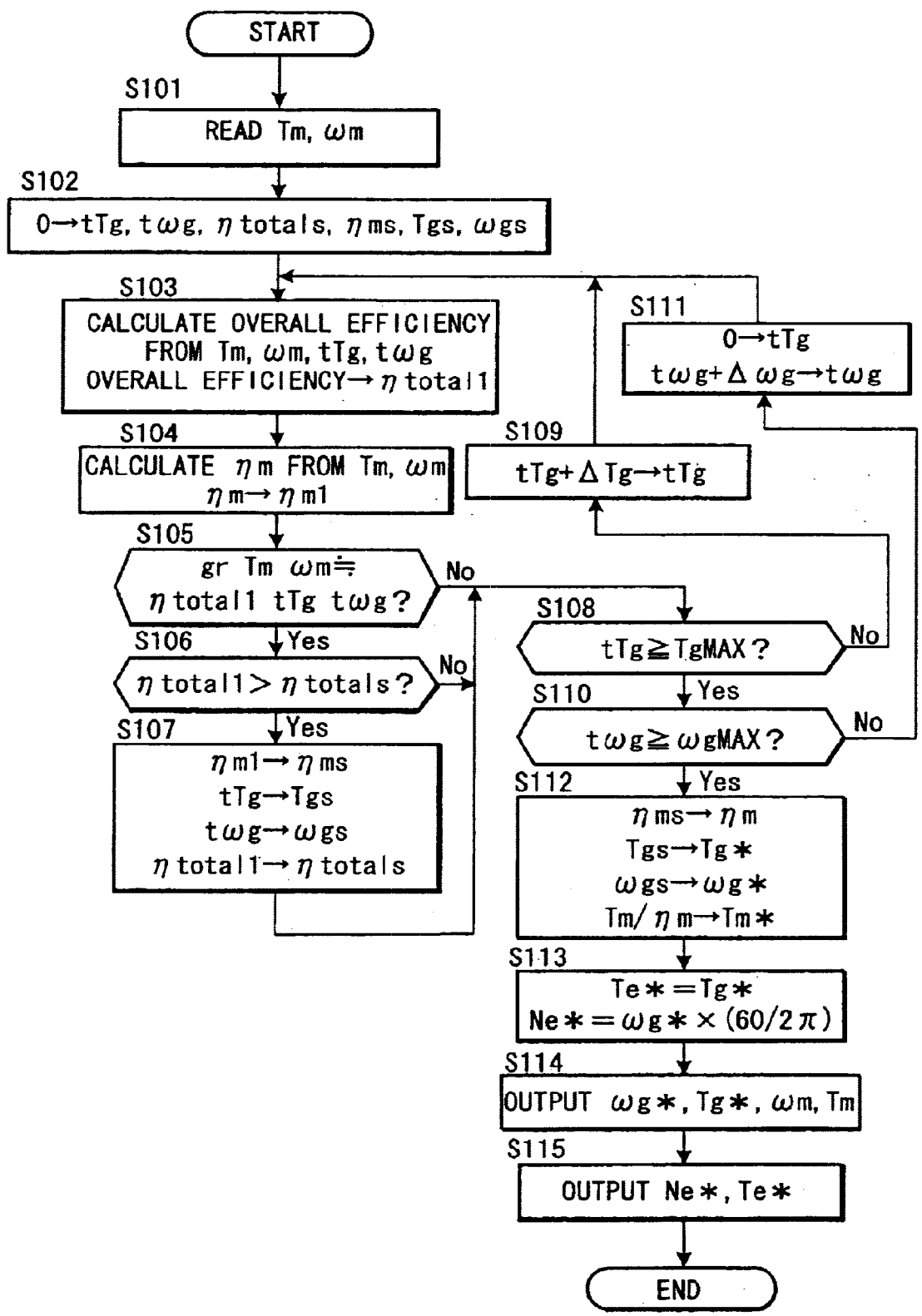
FIG. 10 is a flowchart describing a routine for setting the operating point of the electric motor and the operating point of the generator at maximum overall efficiency, the routine being performed by the controller according to the third embodiment.

Referring to the flowchart in FIG. 10, the functions of the operating point setting unit 44 realized by the microcomputer in the main controller 12 will be described in detail. The operating point setting unit 44 corresponds to the routine shown in FIG. 10. The routine in FIG. 10 is a routine for setting the target torque Tg* and the target rotational angular velocity $\omega$g* of the generator 5 so that the maximum overall efficiency $\eta$total of the rotating electric motor system 50 is attained.

Referring to the flowchart in FIG. 10, a setting routine for the operating point of the generator 5 will be described. In a step S101, the operating point ($\omega$m, Tm) of the electric motor 1 is read, which is calculated by the calculation units 31–33. In a step S102, the variable tTg for the torque of the generator 5 and the variable t$\omega$g for the rotational angular velocity of the generator 5 are set to zero and the values for the variables $\eta$totals, $\eta$ms, Tgs, $\omega$gs are all reset to zero. That is to say, the system is initialized. The variable t$\omega$g and the variable tTg are introduced in order to fluctuate the operating point which is in the possible rotational angular speed range of the generator from a minimum $\omega$gMIN to a maximum $\omega$gMAX and to fluctuate the operating point which is in the possible torque range of the generator from a minimum TgMIN to a maximum TgMAX. Thus, the operating point at which the overall efficiency $\eta$total is calculated is provided at each rotational angular velocity interval $\Delta\omega$g and at each torque interval $\Delta$Tg. In this embodiment, although respective minimum values TgMIN, $\omega$gMIN are set to zero for the sake of simplicity, the invention is not limited in this respect.

In a step S103, an overall efficiency is calculated by looking up an overall efficiency map based on the operating point (t$\omega$g, tTg) of the generator and the operating point ($\omega$m, Tm) of the electric motor. The calculated value of overall efficiency is assigned to the variable $\eta$total1. In this manner, an overall efficiency can be calculated when the operating point of the electric motor is (Tm, $\omega$m) and the operating point of the generator 5 is (tTg, t$\omega$g).

The overall efficiency map uses four values ($\omega$m, Tm, t$\omega$g, tTg) as parameters. When four parameters are used, the map is four-dimensional. However since it is not possible to represent a four-dimensional space, the overall efficiency map will be described with reference to FIG. 11 in an easily understood manner. The overall efficiency map is stored in a microcomputer of the main controller 12.

The format of the overall efficiency map with four parameters is not limited to the map described above. Furthermore the overall efficiency may be determined using a function f ($\omega$m, Tm, t$\omega$g, tTg) of the rotational angular velocity and torque of the electric motor 1 and those of the generator 5.

Figure 11:
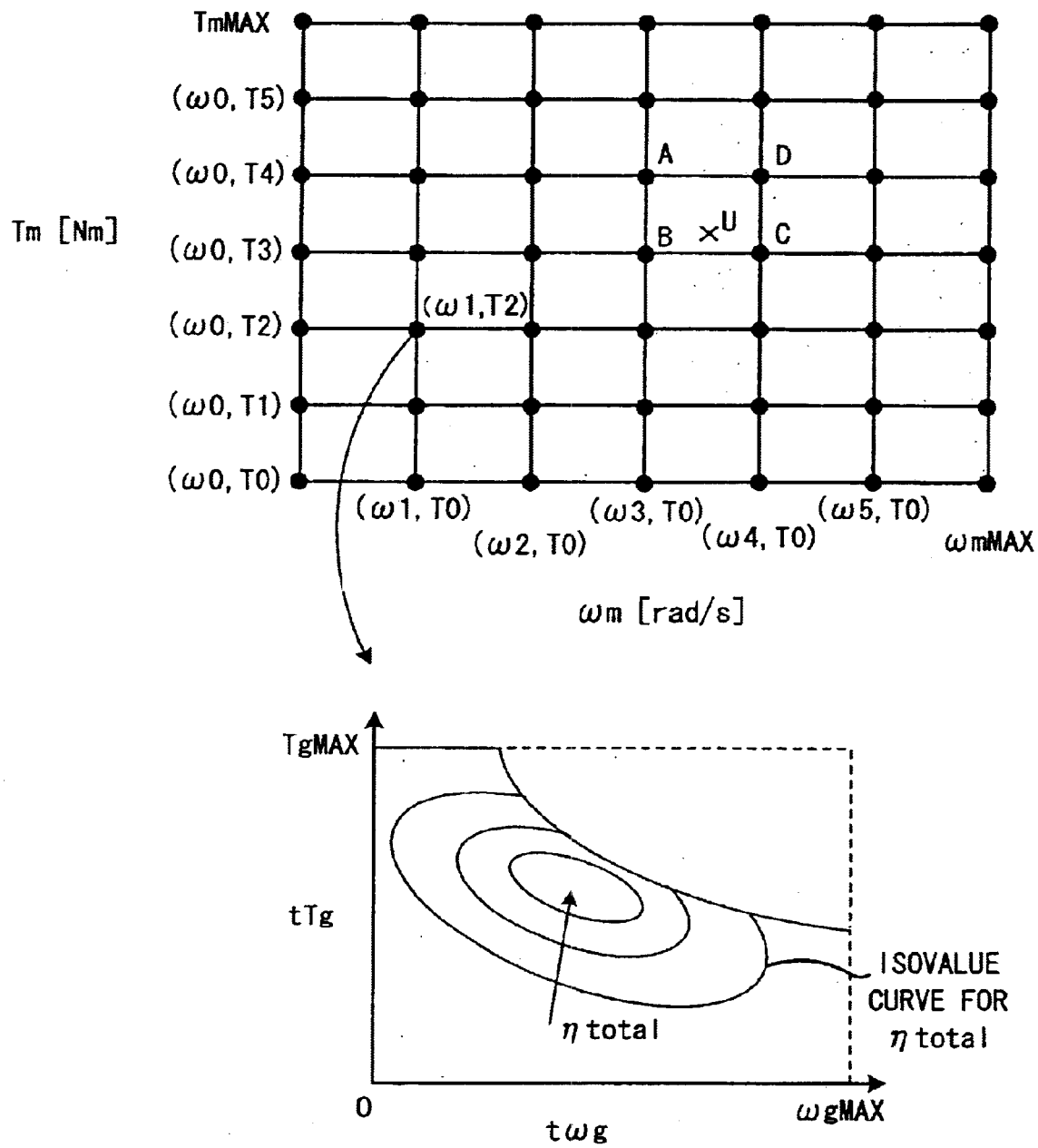
FIG. 11 is a map of overall efficiency for setting the overall efficiency in response to the operating point of the electric motor and the operating point of the generator, wherein the upper panel shows a map of the operating points of the electric motor for which maps of overall efficiency are provided and the lower panel shows an exemplary map of overall efficiency provided for an operating point of the electric motor.

The top panel of FIG. 11 shows a first two-dimensional map in which the black dots show lattice points which representing the operating points ($\omega$m Tm) of the electric motor 1 at which the overall efficiency $\eta$total is calculated. For example, the lattice point ($\omega$1, T2) is a lattice point comprising rotational angular velocity $\omega$1 and torque T2. A lattice point is provided at each torque interval $\Delta$Tg and each rotational angular velocity interval $\Delta\omega$g. A second two-dimensional map for determining overall efficiency is created at each lattice point shown by a black dot. Thus the overall efficiency map is a compilation of a plurality of second two-dimensional maps. The number of the plurality of second two-dimensional maps is equal to the number of the lattice points.

The bottom panel of FIG. 11 is a second two-dimensional map of the overall efficiency $\eta$total at the time when the operating point of the electric motor 1 is at the lattice point (ω1, T2). The second two-dimensional map of the overall efficiency uses the operating points of the generator 5 as parameters. The solid lines in the bottom panel of FIG. 11 show isovalue curves for overall efficiency ηtotal. Thus selecting an operating point (ωm, Tm) for the electric motor 1 and looking up the second two-dimensional map prepared for the selected operating point (ωm, Tm) allows calculation of an overall efficiency ηtotal in response to operating points of the electric motor 1 and the generator 5.

This method of looking up a four-dimensional map comprises a step of selecting a second two-dimensional map based on the operating point (ωm, Tm) of the electric motor 1 by looking up a first two-dimensional map, a step of looking up the second two-dimensional map using the rotational angular velocity tωg and the torque tTg of the generator 5 as parameters, and a step of extracting an overall efficiency corresponding to the operating point (tωg, tTg) of the generator 5. In this manner, looking up a four-dimensional map can be simplified by looking up a two-dimensional map twice.

When the operating point (ωm, Tm) of the electric motor 1 is not at the lattice point, a known extrapolation calculation can be performed. For example, in the top panel of FIG. 11, when the operating point of the electric motor 1 is positioned at U (ωm, Tm) marked by the letter "X", overall efficiency values ηA, ηB, ηC, ηD are calculated by looking up a second two-dimensional map for each of the four lattice points A, B, C, D around U (ωm, Tm). The overall efficiency for the operating point U is calculated by an extrapolation from these four values.

Referring again to FIG. 10, in the step S104, the efficiency ωm of the motor is calculated by looking up a predetermined map on the basis of the operating point (ωm, Tm) for the electric motor. The resulting value assigned to the variable ηm1 for motor efficiency. Herein ηm is the efficiency of a single motor not including inverter loss. This predetermined map will be described hereafter with reference to a step S207 in FIG. 12.

In a step S105, it is determined whether or not the operating point (tηg, tTg) of the generator 5 is an operating point which satisfies Equation (41). Here, it is determined whether the following equation derived from Equation (41) holds.

$$gr \cdot Tm \cdot \omega m / \eta total 1 = tTg \cdot t\omega g \qquad (42)$$

The actual calculation introduces a margin so that the left and rights sides of the equation need only be approximately equal. In order to avoid a division calculation which requires calculation time, it is determined whether or not the following equation is established.

$$gr \cdot Tm \cdot \omega m = \eta total 1 \cdot tTg \cdot t\omega g \qquad (43)$$

That is to say, in the step S105, the term gr·Tm·ωm is compared with the term ηtotal1·tTg·tωg. When the term gr·Tm·ωm is equal to term ηtotal1·tTg·tωg with an accuracy of about 99%, it is determined that Equation (43) holds.

When Equation (43) is satisfied, the routine proceeds to a step S106 and the value for the variable ηtotal1 is compared with the value for the variable ηtotals for the overall efficiency. When the value for ηtotal1 is greater than the value for ηtotals, the routine proceeds to a step S107 where the value for the variable ηm1 at that time is assigned to the variable ηms and the values for tωg and tTg of the generator 5 at that time are assigned to the variables Tgs and ωgs, respectively. Further, in the step S107, the value of ηtotals is updated to the value of the variable ηtotal1, in other words, the value of the variable ηtotal1 is assigned to the variable ηtotals.

When Equation (43) is not satisfied or when the value of the variable ηtotal1 is less than the value for the variable ηtotals even when Equation (43) is satisfied, the routine skips the step S107 and proceeds to a step S108.

In the step S108, the variable tTg and the maximum value TgMAX for generator torque are compared. When tTg is smaller than TgMAX, the routine proceeds to a step S109 and the variable tTg is increased by the torque increment ΔTg. Thereafter the routine returns to the step S103 and executes the process in the steps S103 to S109. Since the incrementing process for the variable tTg in the step S109 continues until the variable tTg reaches a maximum value TgMAX, the process in the steps S103 to S109 is repeated until the variable tTg reaches the maximum value TgMAX. The operating point of the generator 5 which displays maximum overall efficiency is selected from the operating points satisfying Equation (43) by the repetition process. The rotational angular velocity and torque of the generator 5, which display maximum overall efficiency, are assigned to the variables ωgs, Tgs during the repetition process under the condition that the generator rotational angular velocity is zero (the variable tωg=0). Also, the motor efficiency in the situation where the maximum overall efficiency is attained under this condition is assigned to the variable ηms.

When the variable tTg reaches the maximum value TgMAX, the routine proceeds to a step S110 and the variable tωg for the rotational angular velocity is compared with the maximum value ωgMAX for the rotational angular velocity of the generator 5. Since at this timing, tωg=0, tωg is smaller than ωgMAX and the routine proceeds to a step S111. In the step S111, the variable tTg for torque is returned to a minimum value of zero, and the variable tωg for the rotational angular velocity is increased by the increment Δωg. Then, the routine returns to the step S103. Thereafter the process in the steps S103 to S109 is repeated until the variable for torque tTg reaches a maximum value TgMAX. When the repetition process is completed, the operating point of the generator 5 which displays maximum overall efficiency is selected from the operating points satisfying Equation (43). Up to this timing, the rotational angular velocity and torque of the generator 5, which displays maximum overall efficiency, are assigned to the variables ωgs, Tgs under the condition that the variable tωg for rotational angular velocity is smaller or equal to Δωg. Also, the motor efficiency in the situation where the maximum overall efficiency is attained under this condition is assigned to the variable ηms.

When the variable tTg for torque reaches the maximum value TgMAX, the routine proceeds to a step S110 and the variable tωg for the rotational angular velocity is compared with the maximum value ωgMAX. Since at this timing, tωg=Δωg, tωg is smaller than ωgMAX and the routine proceeds to a step S111. In the step S111, the variable tTg for torque is returned to a minimum value of zero, the variable tωg for the rotational angular velocity is increased by the increment Δωg and the routine returns to the step S103. Thereafter the process in the steps S103 to S109 is repeated until the variable for torque tTg reaches a maximum value TgMAX. When the repetition process is completed, the operating point of the generator 5 which displays maximum overall efficiency is selected from the operating points satisfying Equation (43). Up to this timing, the rotational angular velocity and torque of the generator 5, which displays maximum overall efficiency, are assigned to the variables ωgs, Tgs under the condition that the variable tωg for rotational angular velocity is smaller or equal to 2·Δωg. Also, the motor efficiency in the situation where the maximum overall efficiency is attained under this condition is assigned to the variable ηms.

Thereafter the same process is repeated and the variable ωg for rotational angular velocity of the generator 5 is increased to 3·Δωg and 4·Δωg, ... until the variable ωg for rotational angular velocity reaches the maximum value ωgMAX. The operating point of the generator 5 which displays maximum overall efficiency are selected from the operating points satisfying Equation (43) in the overall operating range of the generator 5. The overall operating range of the generator 5 is 0–ωgMAX for rotational angular velocity and 0–TgMAX for torque. At this timing, the routine finishes searching for the rotational angular velocity and torque of the generator 5 which satisfy the condition that the overall efficiency of the rotating electrical machine system 50 is at a maximum, throughout the overall operating range of the generator 5. The variable ηms takes the value of the motor efficiency in the situation where the maximum overall efficiency is attained.

Thereafter the routine proceeds to a step S112 where the value of the variable ηms is set as motor efficiency ηm, the value of the variable Tgs is set as generator target torque Tg* and the value of the variable ωgs is set as a generator target rotational angular speed ωg*. In the step S112, a value representing the torque Tm of the electric motor 1 divided by the efficiency ηm of the electric motor 1 is set as a target torque Tm* of the electric motor 1.

In a step S113, the target torque Te* and the target rotational angular speed Ne* of the engine are set. That is to say, the value Tg* is assigned as a target engine torque Te*. Furthermore a target rotational angular speed Ne*[rpm] is calculated from the equation Ne*=ωg*×(60/2π). Since loss occurs when the generator 5 generates power, it is necessary to increase the engine output by an amount corresponding to the amount of loss. Therefore, in this embodiment, the generator loss is included in the generator efficiency which is described hereafter with reference to a step S208 in FIG. 12.

In steps S114 and S115, the calculated operating points (ωg*, Tg*) of the generator 5 and the operating point (ωm, Tm*) of the electric motor 1 are outputted to the current command computing unit 37 shown in FIG. 9. The engine target torque Te* and the target rotation speed Ne* are outputted to the engine controller 11 shown in FIG. 1.

Figure 12:
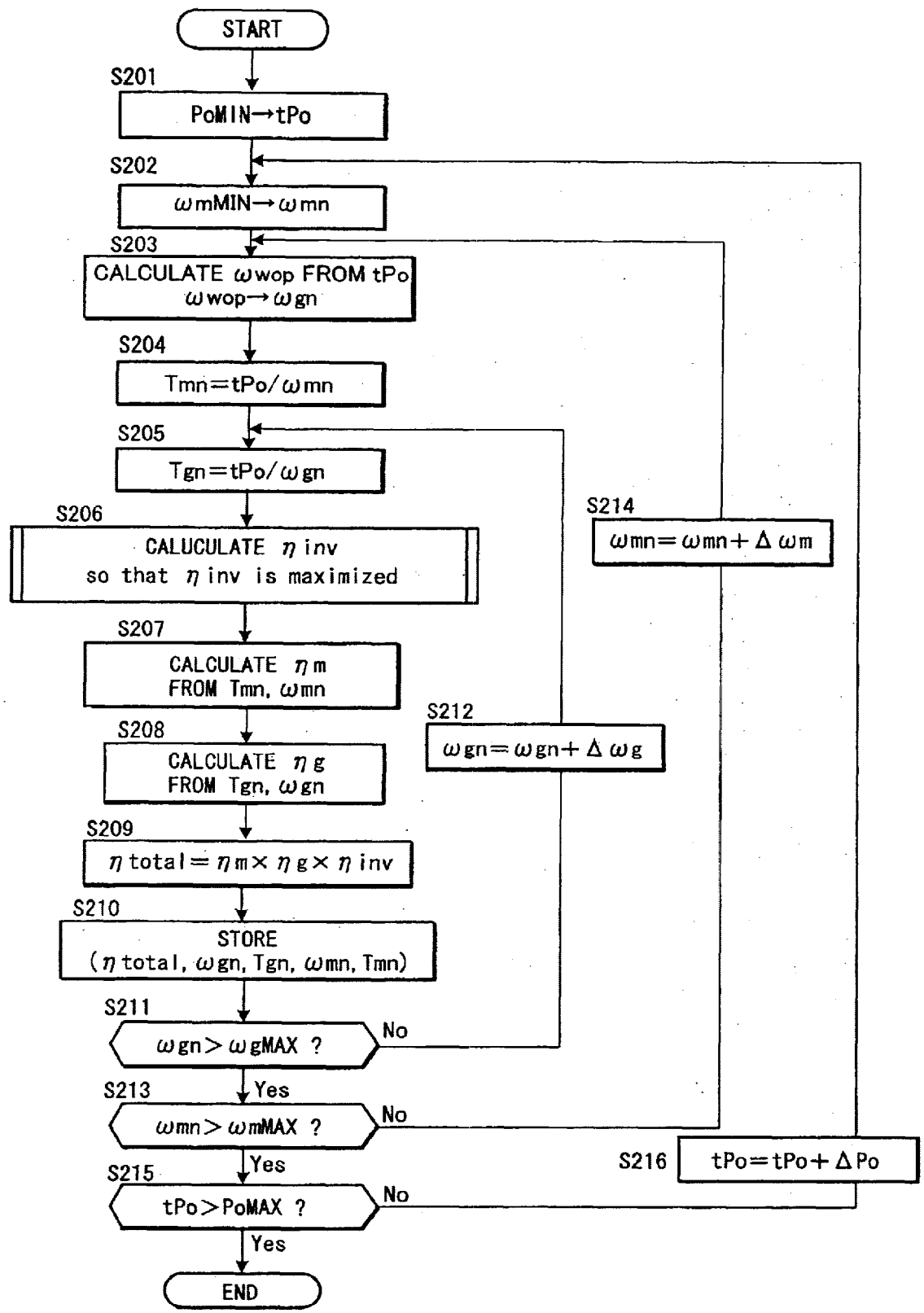
FIG. 12 is a flowchart describing a method of generating the overall efficiency map.

Next, referring to the flowchart in FIG. 12, an exemplary method of generating an overall efficiency map will be now described.

It is preferred to generate the overall efficiency map using a computer such as a personal computer because the procedure for generating the overall efficiency map is complicated. The sequence of generating the overall efficiency map using a computer will be described below.

In a step S201, the minimum value PoMIN is substituted for the variable tPo for the generator output. In a step S202, the minimum value ωmMIN for the rotational angular velocity of the electric motor 1 is substituted for the variable ωmn related to the rotational angular velocity of the electric motor 1.

In a step S203, a rotational angular velocity ωwop of the generator 5 when operated at a generator output of PoMIN with the throttle for the engine 6 fully open is calculated. This calculation is performed by referring to the output characteristics which is taken by the generator 5 when the throttle for the engine 6 is fully open. The output characteristics is shown in FIG. 6. The calculated value ωwop is substituted as the variable ωgn for the generator rotational angular speed.

In the step S204, the value of tPo divided by the value of ωmn for the motor rotational angular velocity is substituted as the variable Tmn for motor torque. In the step S205, a value of tPo divided by the value of ωgn for the generator rotational angular velocity is substituted as the variable Tgn for generator torque.

Figure 13:
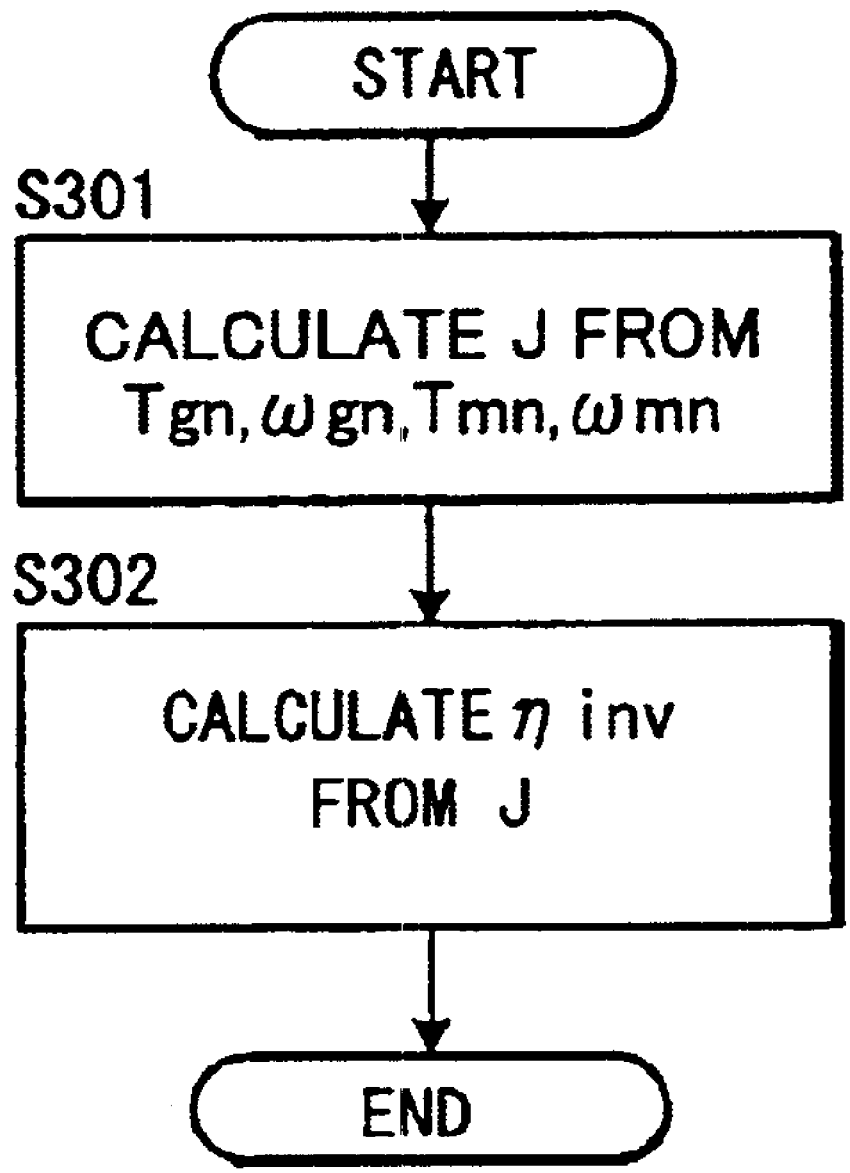
FIG. 13 is a flowchart describing a subroutine in FIG. 12.

Then, in a step S206, the maximum efficiency ηinv of the inverter 8 is calculated for the operating points (ωgn, Tgn) (ωmn, Tmn) of the electric motor 1 and the generator 5 at a generator output PoMIN. The calculation of the operating points is executed by the sub-routine shown in FIG. 13.

In the step S301, the d-axis current and q-axis current of the electric motor 1 as well as the d-axis current and q-axis current of the generator 5 are determined based on the operating point (ωmn, Tmn) of the electric motor 1 and the operating point (ωgn, Tgn) of the generator 5. The values for the d-axis currents and q-axis currents are determined so that they satisfy all of Equations (18) to (25) and minimize the evaluation function Jp in Equation (26), due to the fact that the inverter 8 generates a composite current whose current average value is minimized by the motor controller 7. Simultaneously, a value J of the evaluation function Jp, which is the minimized value of the evaluation function Jp, in order words, a minimum value, is calculated.

In the step S302, an inverter efficiency ηinv is calculated from the equation below using the control currents (Idm, Iqm, Idg, Iqg) used to calculate the value of J in the evaluation function.

$$\eta inv = K \cdot \{(Idm^2 + Iqm^2)^{1/2} + (Idg^2 + Idg^2)^{1/2}\} / \qquad (51)$$
$$\{(idm^2 + Iqm^2 + Idg^2 + Iqg^2)^{1/2}\}$$
$$= K \cdot (1/J) \times \{(Idm^2 + Iqm^2)^{1/2} + (Idg^2 + Iqg^2)^{1/2}\}$$

In Equation (51), the inverter efficiency ηinv is maximized if the value J of the evaluation function takes a minimum value. As shown in Equation (52), Equation (51) is satisfied because the reduction ratio of the current average value of the composite current equals the reduction ratio for inverter loss.

$$1/\eta inv \propto \{(idm^2+Iqm^2+Idg^2+Iqg^2)^{1/2}\}/\{(Idm^2+Iqm^2)^{1/2}+(Idg^2+Iqg^2)^{1/2}\} \qquad (52)$$

The denominator on the right side of Equation (52) is the sum of the magnitude of the currents when the two rotating electrical machines 1, 5 are driven independently by independent currents. Thus the right side of Equation (52) expresses the reduction ratio of the current average value when the rotating electrical machines are driven by a composite current.

Referring again to FIG. 12, in the step S207, a electric motor efficiency ηm not including the inverter loss is calculated by looking up a predetermined map on the basis of the operating point (ωmn, Tmn) of the electric motor 1. Furthermore in the step S208, a generator efficiency ηg not including the inverter loss is calculated by looking up a predetermined map on the basis of the operating point (ωgn, Tgn) of the generator 5.

These maps are stored in a storage device such as a hard disk in a computer. The generation of these maps is performed in the following manner. A general approximation exists in order to calculate loss (copper loss) in the rotating electrical machines, however the loss in the rotating electrical machines is considerably affected by the shape of the specific rotating electrical machine. Consequently, the loss produced by the electric motor 1 and the generator 5 can be accurately calculated at each operating point on the basis of experiments or analysis of the magnetic fields. Thus efficiency can be calculated because it displays an inverse relationship to loss. A map is produced showing efficiency at each operating point. Herein engine efficiency is contained in the efficiency of the generator 5.

In the step S209, the three values for efficiency ηinv, ηm, ηg are multiplied to calculate an overall efficiency ηtotal. In the step S210, the overall efficiency ηtotal as well as the operating point (ωmn, Tmn) of the electric motor 1 and the operating point (ωgn, Tgn) of the generator 5 are formed into a single data group (ηtotal, ωgn, Tgn, ωmn, Tmn) and stored in the storage device of the computer. This data is actually data related to an overall efficiency and the operating point when the inverter efficiency is maximized.

In a step S211, the variable ωgn for the rotational angular velocity is compared with the maximum value ωgMAX. When ωgn is smaller than ωgMAX, the routine proceeds to a step S212. In the step S212, the variable ωgn for the rotational angular velocity is increased by the increment Δωg for rotational angular velocity. Thereafter the routine returns to the step S205 and the process in the steps S205 to S212 performed. The process in the steps S205 to S211 is repeated until the variable ωgn for the rotational angular velocity reaches the maximum value ωgMAX. While the process in the steps S205 to S212 is repeated, the process in the step S210 forms several data groups (ηtotal, ωgn, Tgn, ωmn, Tmn) under the condition that the generator output is a minimum value PoMIN and the variable ωmn for the motor rotational angular velocity is a minimum value of ωmMIN.

When ωgn is larger than ωgMAX, the routine proceeds from the step S211 to the step S213 and the variable ωmn for the motor rotational angular velocity is compared with the maximum value ωmMAX. At this timing, since ωmn=ωmMIN and ωmn is smaller than ωmMAX, the routine proceeds to a step S214 and the variable ωmn for the motor rotational angular velocity is increased by the increment Δωm for rotational angular velocity. Thereafter the routine returns to the step S203 and then, in the step S204, the variable Tmn for the motor torque, at the time that the variable ωmn for the motor rotational angular velocity takes a value of ωmMIN+Δωm, is calculated.

Then, the process in the steps S205 to S212 is repeated until the variable ωgn for the generator rotational angular velocity reaches the maximum value ωgMAX. As a result, when the repetition process is completed, several data groups (ηtotal, ωgn, Tgn, ωmn, Tmn) are formed under the condition that the generator output is a minimum value PoMIN and the variable ωmn of the generator rotational angular velocity is smaller or equal to ωmMIN+Δωm.

When the variable ωgn for the generator rotational angular velocity is once again larger than the maximum value ωgMAX in the step S211, the routine proceeds to the step S213. In the step S213, the variable ωmn for the motor rotational angular velocity is compared with the maximum value ωmMAX. At this timing, since ωmn=ωmMIN+Δωm, ωmn is smaller than ωmMAX. Thus the routine proceeds to a step S214 and the variable ωmn for the motor rotational angular velocity is increased by the increment Δωm for rotational angular velocity. Thereafter the routine returns to the step S203 and then, in the step S204, the variable Tmn for the motor torque at the time when the variable ωmn for the motor rotational angular velocity takes a value of ωmMIN+2·Δωm is calculated. Then the process in the steps S205 to S212 is repeated until the variable ωgn for the generator rotational angular velocity reaches the maximum value ωgMAX. As a result, when the repetition process is completed, data groups (ηtotal, ωgn, Tgn, ωmn, Tmn) are formed under the condition that the generator output is a minimum value PoMIN and the variable ωmn of the motor rotational angular velocity is smaller or equal to ωmMIN+2Δωm.

After the above process is repeated until the variable ωmn for the motor rotational angular velocity reaches a maximum value of ωmMAX, the whole rotational angular velocity range of the electric motor 1 and the generator 5 is thoroughly searched for an inverter efficiency. The overall rotational angular velocity range of the generator 5 extends from ωwop to ωgMAX and the overall rotational angular velocity range of the motor 1 extends from ωmn to ωmMAX.

In this manner, the setting of the data groups (ηtotal, ωgn, Tgn, ωmn, Tmn) is completed under the condition that the generator output is a minimum value of PoMIN.

In a step S215, the variable tPo for the output of the generator 5 is compared with the maximum value PoMAX. Since tPo=PoMIN initially, tPo is smaller than PoMAX. Thus the routine proceeds to a step S216 and the variable tPo for the output of the generator 5 is increased by the increment ΔPo.

Thereafter the routine returns to the step S202. In the step S210, data groups (ηtotal, ωgn, Tgn, ωmn, Tmn) are set under the condition that the generator output is a value of PoMAX+ΔPo. After the process in the steps S202–S215 is executed, groups of data (ηtotal, Tgn, ωgn, Tmn, ωmn) are obtained under the condition that the generator output is PoMIN+ΔPo. These data are include an overall efficiency and an operating point under the condition that the generator output is PoMIN+ΔPo. These data groups are stored in the storage device.

Since the amount of the data increases on each occasion the increment ΔPo is added to the variable tPo for the generator output, a plurality of data groups within the overall range PoMIN–PoMAX for the generator output is obtained when the process in the steps S202 to S216 is repeated until the variable tPo for the generator output reaches a maximum value PoMAX. These data groups are a compilation of data related to overall efficiency and each operating point of the electric motor 1 and the generator 5. Thus overall efficiency maps allowing maximum efficiency to be searched are generated from the data sets using the operating points of the electric motor 1 and the generator 5 as parameters.

Figure 3:
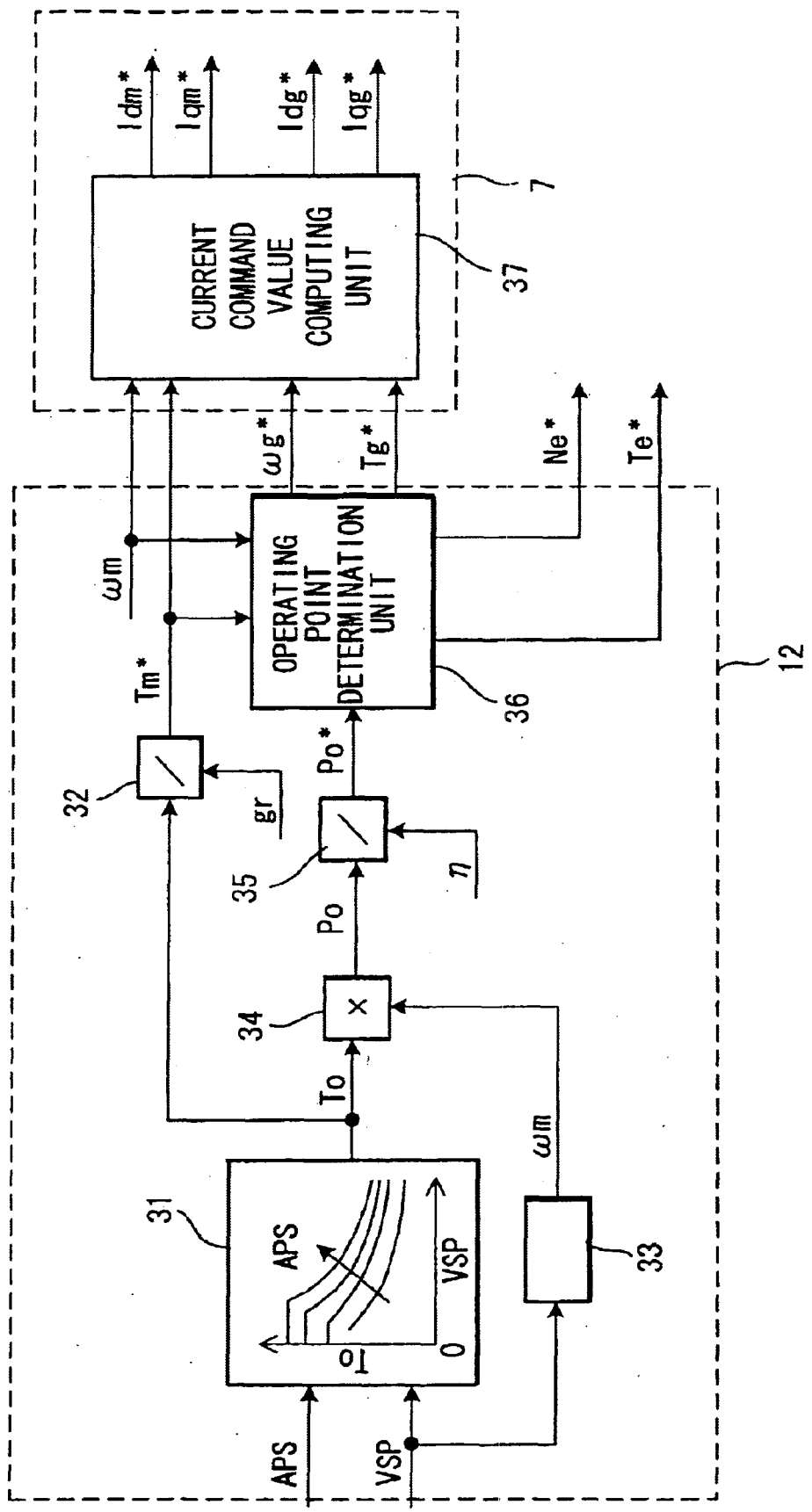
FIG. 3 is a block diagram showing control performed by a controller according to the first and second embodiments of this invention.

Referring to FIG. 3, the current command value computing unit 37 determines a current for the electric motor 1 and a current for the generator 5, based on the operating point (ωm, Tm*) for the electric motor 1 and the operating point for the generator 5 (ωg*, Tg*) which maximize overall efficiency. The current is determined so that the current average value of the composite current combining the currents for the electric motor 1 and the generator 5 is minimized. More precisely, the d-axis current command value and the q-axis current command value of the generator 5 as well as the d-axis current command value and the q-axis current command value of the electric motor 1 are determined so that the evaluation function Jp in Equation (26) is minimized using all restricting conditions in Equation (18) to Equation (25). The current command value computing unit 37 generates the four determined values as command values Idm*, Iqm*, Idg*, Iqg* for the d and q-axis currents. Naturally it goes without saying that the values ωg*, Tg*, Tm* can be used instead of ωg, Tg, Tm in Equation (18) to Equation (25).

According to this embodiment, the operating point of each rotating electrical machine 1, 5, that is to say, rotation speed and torque are set so that overall efficiency for the inverter 8 and the all rotating electrical machines, that is to say, the electric motor 1 and the generator 5, are maximized. Consequently, it is possible to reduce the total loss of a rotating electrical machine system 50 in which a current from a single inverter 8 is supplied to a plurality of rotating electrical machines undergoing vector control.

The overall efficiency represents the product of the inverter efficiency calculated on the basis of the operating point of both the electric motor and the generator 5, the generator efficiency not including the inverter loss, and the motor efficiency not including the inverter loss. Thus it is possible to set the inverter efficiency separately and to perform an optimal setting for the overall efficiency even when controlling a plurality of rotating electrical machines 1, 5 with a single inverter 8.

Although the setting the operating point (torque, rotation speed) of the rotating electrical machines 1, 5 has been described in order to maximize the overall efficiency of the rotating electrical machine system 50, this invention is not limited to maximizing the overall efficiency and it is also possible to set the operating point (torque, rotation speed) of the rotating electrical machines 1, 5 in order to increase the overall efficiency of the rotating electrical machine system 50 including the inverter 8 and all rotating electrical machines 1, 5.

The entire contents of Japanese Patent Applications P2001-209125 (filed Jul. 10, 2001) and P2001-207638 (filed Jul. 9, 2001) are incorporated herein by reference.

Although the invention has been described above by reference to certain embodiments of the invention, the invention is not limited to the embodiments described above.

Modifications and variations of the embodiments described above will occur to those skilled in the art, in light of the above teachings. The scope of the invention is defined with reference to the following claims.

What is claimed is:

1. A control device for a rotating electrical machine system having a first rotating electrical machine and a second rotating electrical machine, the rotation of each rotating electrical machine being controlled by a current flowing in response to the rotational phase of a rotor thereof, the control device comprising:
   a single current control circuit which is connected to the first and second rotating electrical machines and produces a composite current comprising the current for each rotating electrical machine; and
   a controller functioning to:
      set an operating point of the first rotating electrical machine,
      set an operating point of the second rotating electrical machine in response to the set operating point of the first rotating electrical machine so that one of the efficiency of the current control circuit and the overall efficiency is maximized, wherein the overall efficiency is the product of the efficiency of the current control circuit, the efficiency of the first rotating electrical machine, and the efficiency of the second rotating electrical machine,
      set the current for each rotating electrical machine based on the set operating points of the first and second rotating electrical machines, so as to minimize the current average value of the composite current while maintaining the set operating points of the first and second rotating electrical machines, and control the current control circuit so that the current control circuit produces the composite current for all the first and second rotating electrical machines.

2. The control device as defined by claim 1, wherein the operating point of the first rotating electrical machine and the operating point of the second rotating electrical machine comprise a set of a rotational angular velocity and torque.

3. The control device as defined by claim 1, wherein the controller functions to set d-axis and g-axis currents for each rotating electrical machine based on the set operating points of the first and second rotating electrical machines so as to minimize an evaluation function corresponding to the current average value of the composite current, the evaluation function being a function of a peak value of the current for each rotating electrical machine.

4. The control device as defined by claim 1, wherein the first and second rotating electrical machines comprises a generator connected to an engine and an electric motor, and wherein power generated by the generator is supplied to the electric motor.

5. The control device for a rotating electrical machine as defined by claim 4, wherein the controller stores a four-dimensional map for setting the overall efficiency based on both the operating point of the electric motor and the operating point of the generator, and sets the generator operating point which maximizes the overall efficiency by looking up the four-dimensional map.

6. The control device as defined by claim 5, wherein the four-dimensional map is generated by:
   determining an operating point for the electric motor and an operating point for the generator,
   determining a minimum value for the current average value of the composite current based on the determined operating point for the electric motor and the determined operating point for the generator,
   calculating an efficiency of the single current control circuit based on the minimum value which is taken when the current average value of the composite current takes the minimum value,
   calculating an efficiency of the generator and an efficiency of the electric motor, not including the loss of the single current control circuit, which are taken when the current average value of the composite current takes the minimum value,
   calculating a value representing an overall efficiency from the product of the calculated efficiency of the generator, the calculated efficiency of the electric motor and the calculated efficiency of the single current control circuit, and
   storing a data set of the determined operating point of the electric motor, the determined operating point of the generator and the calculated value representing an overall efficiency.

7. The control device for a rotating electrical machine as defined by claim 5,
   wherein the four-dimensional map comprises a combination of a first two-dimensional map representing the operating points of the electric motor for each of which a second two dimensional map of overall efficiency is provided, and the second two dimensional map for setting an overall efficiency from an operating point of the generator,
   wherein the controller selects the second two-dimensional map corresponding to the operating point of the electric motor by looking up the first two-dimensional map based on the operating point of the electric motor, and
   wherein the controller sets an operating point for the generator so that the overall efficiency is maximized, by looking up the second two-dimensional map based on the operating point of the generator.

8. The control device as defined by claim 1, wherein the rotating electrical machine system is mounted in a hybrid vehicle, and the first and second rotating electrical machines comprise a generator connected to an engine and an electric motor connected to the drive shaft of the vehicle; and one of the rotating electrical machines is the electric motor and the other rotating electrical machine is the generator, and the operating point of the electric motor is set in response to a speed of the vehicle and an accelerator position of the hybrid vehicle.

9. The control device as defined by claim 4, wherein the controller sets a current for each rotating electrical machine so that the current average value for the composite current is minimized only in a condition in which the maximum engine torque is greater than the torque of the generator.

10. The control device as defined by claim 4, wherein the controller functions to:

determine an operating point of the generator at which optimal engine fuel economy is attained, determine an operating point of the generator at which the current average value of the composite current is minimized, and set the current for each rotating electrical machine based on the two determined operating points of the generator.

11. A control method for a rotating electrical machine system having a first rotating electrical machine and a second rotating electrical machine, the rotation of each rotating electrical machine being controlled by a current flowing in response to the rotational phase of a rotor thereof, and having a single current control circuit which is connected to the first and second rotating electrical machines and produces a composite current comprising the current for each rotating electrical machine, the control method comprising:

setting an operating point of the first rotating electrical machine;

setting an operating point of the second rotating electrical machine in response to the set operating point of the first rotating electrical machine so that one of the efficiency of the current control circuit and the overall efficiency is maximized, wherein the overall efficiency is the product of the efficiency of the current control circuit, the efficiency of the first rotating electrical machine, and the efficiency of the second rotating electrical machine;

setting the current for each rotating electrical machine based on the set operating points of the first and second rotating electrical machines so as to minimize the current average value of the composite current while maintaining the set operating points of the first and second rotating electrical machines; and controlling the current control circuit so that the current control circuit produces the composite current for the first and second rotating electrical machines.

12. A control device for a rotating electrical machine system having a first rotating electrical machine and a second rotating electrical machines, the rotation of each rotating electrical machine being controlled by a current flowing in response to the rotational phase of a rotor thereof, the control device comprising:

a single current control circuit which is connected to the first and second rotating electrical machines and produces a composite current comprising the current for each rotating electrical machine;

means for setting an operating point of the first rotating electrical machine;

means for setting an operating point of the second rotating electrical machine in response to the set operating point of the first rotating electrical machine so that one of the efficiency of the current control circuit and the overall efficiency is maximized, wherein the overall efficiency is the product of the efficiency of the current control circuit, the efficiency of the first rotating electrical machine, and the efficiency of the second rotating electrical machine;

means for setting the current for each rotating electrical machine based on the set operating points of the first and second rotating electrical machines; and means for controlling the current control circuit to produce the composite current for the first and second rotating electrical machines, wherein the current average value of the composite current is minimized while maintaining the set operating points of the first and second rotating electrical machines.

* * * * *